March 25, 1958     A. M. CAMPBELL     2,827,788
GYROSCOPE
Filed April 15, 1954
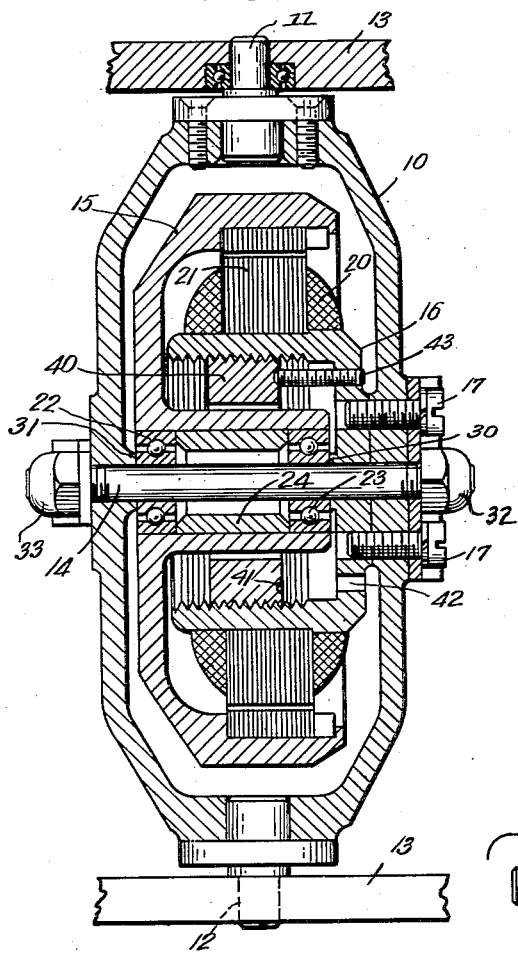
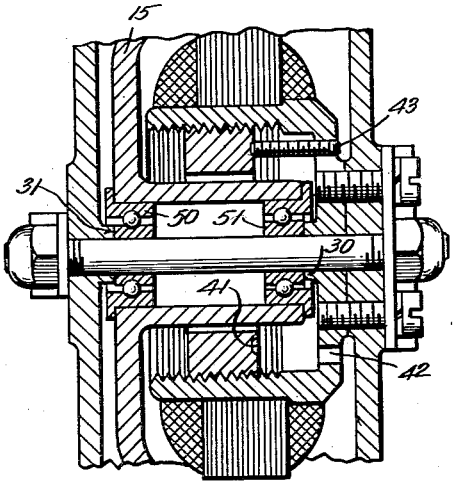
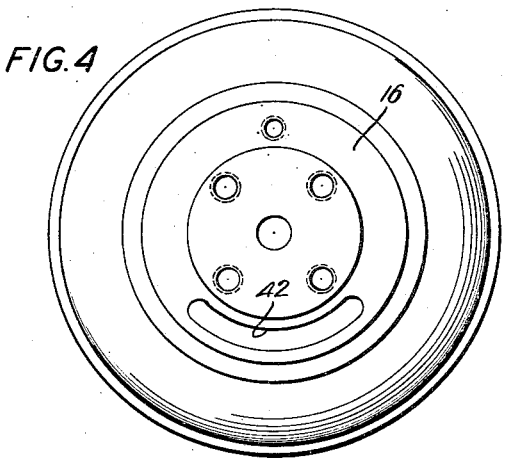
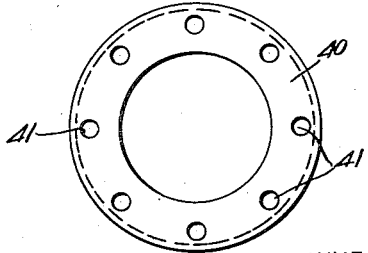
INVENTOR
ALAN M. CAMPBELL
BY R. W. Furlong
ATTORNEY

United States Patent Office 2,827,788
Patented Mar. 25, 1958

2,827,788

GYROSCOPE

Alan M. Campbell, Weston, Mass., assignor, by mesne assignments, to Minneapolis-Honeywell Regulator Company, a corporation of Delaware Application April 15, 1954, Serial No. 423,267

6 Claims. (Cl. 74—5)

This invention relates to a gyroscope having static balancing means and pertains more specifically to a gyroscope having in combination static balancing means together with means for adjusting the rotor bearings without disturbing the static balance.

One object of the invention is to provide a gyroscope having adjustable static balancing means which is readily accessible for adjustment after assembly of the gyroscope.

Another object is to provide a gyroscope having such a static balancing means which may readily be locked in any desired position.

A further object is to provide a gyroscope having a static balancing mass adjustably secured to the stator for movement axially with respect to the rotor and stator together with releasable locking means for securing the mass in fixed position with respect to the stator.

Another object is to provide a gyroscope having means for adjusting the rotor bearings at opposite sides of the rotor simultaneously without substantially affecting the static balance of the assembled gyroscope.

Still a further object is to provide a gyroscope of simple construction which is readily assembled and which may readily be statically balanced after assembly.

Other and further objects will be apparent from the drawing and from the description which follows.

In the drawing:

Fig. 1 is a view in vertical section showing one embodiment of the invention;

Fig. 2 is a view in vertical section of a portion of a second embodiment of the invention;

Fig. 3 is a detail view of the rotor shaft showing the difference in pitch of the threads at opposite ends of the shaft and showing a socket in the end of the shaft for rotating it;

Fig. 4 is a detail view of the stator viewed from the right as seen in Fig. 1;

Fig. 5 is a detail view of the static balancing mass as seen from the right in Fig. 1.

As shown in Fig. 1, the gyroscope includes generally a gimbal frame 10 carrying stub shafts 11, 12 at opposite ends which are journaled in any suitable housing or frame 13, 13. Mounted transversely of gimbal frame 10 is shaft 14 about which are mounted rotor 15 and stator 16. Stator 16 is secured at its base to gimbal frame 10 by means of suitable screws or bolts 17, 17.

Mounted about the periphery of stator 16 is a laminated core member 21 and a conventional winding 20 to which power may be supplied from any suitable source (not shown) to drive the rotor. Rotor 15 is mounted on shaft 14 by means of two ring-type ball bearings 22, 23 spaced apart by means of sleeve spacer 24, the spacer 24 engaging the outer race of each bearing and being itself secured by a shrink fit within the hub of the rotor. The bearings 22, 23 are held in fixed position axially of shaft 14 by means of an internal shoulder 30 on stator 16 and shoulder 31 on gimbal frame 10, the two shoulders bearing on the respective inner races of bearings 22, 23, being held in that position by means of nuts or thrust members 32, 33 threaded on shaft 14 at opposite ends thereof. Threaded portions 34, 35 at opposite ends of the shaft are of different pitch, matching the pitch of nuts 32 and 33, respectively. A socket 36 is provided in one end of shaft 14 to enable it to be rotated within the assembly by means of a suitable socket-type wrench. Because of the difference in pitch of the threads at opposite ends of the shaft, rotation of the shaft in one direction causes the sides of the gimbal frame to be pressed together, while rotation in the opposite direction permits the sides of the gimbal frame 10 to spring apart, thus varying the load on bearings 22, 23.

Static balancing mass 40 consists of an annular mass threaded within the hollow body portion of stator 16 and is provided with a number of spaced depressions or concavities 41, 41 on its bottom face. Stator 16 is provided with an elongated arcuate slot 42 in its bottom face, which permits insertion of a suitable tool therethrough to engage with concavities 41, 41 and rotate mass 40, thus moving it axially of the stator and rotor along shaft 14. Screw 43 threaded into the bottom of stator 16 is in a position to engage concavities 41 as the mass 40 is rotated and may be employed to lock mass 40 in any desired fixed position with respect to stator 16. Although an opening through gimbal frame 10 may be provided to facilitate access to the outer end of screw 43, it is preferable to assemble the device with the stator rotated 90° from the position shown in Figs. 1 and 2 so that the end of screw 43 is alongside the gimbal frame and hence readily accessible.

In Fig. 2, a second embodiment of the invention is shown in which bearings 50, 51 are provided with flanges on their outer races which engage opposite sides of rotor 15, thus eliminating the necessity for separate spacer element 24. The inner races of bearings 50, 51 are engaged by shoulders 30, 31 as in the case of the embodiment shown in Fig. 1.

After assembly of the device of the present invention as shown in Fig. 1 or 2, static balance of the whole assembly may be achieved by backing off screw 43, then inserting a small rod or screw driver through slot 42 and rotating mass 40 by means of depressions or concavities 41. Rotation of mass 40 is continued in the desired direction until the desired static balance has been achieved, whereupon screw 43 is advanced to engage the appropriate concavity 41 and lock mass 40 in the desired fixed position. Either before or after static balance is achieved, the play in bearings 22, 23 or bearings 50, 51, as the case may be, may be adjusted by varying the load on the inner races of the bearings. This is accomplished simply by insertion of a suitable wrench in socket 36 at the end of shaft 14 and rotation of the shaft in the desired direction. Because of the difference in pitch of the threaded portions 34, 35 at opposite ends of the shaft, the sides of gimbal frame 10 will be forced together or permitted to spring apart, as the case may be, thus varying the load on both sets of bearings simultaneously from opposite sides, so that no substantial disturbance of the static balance occurs.

Although I have herein described specific embodiments of my invention, I do not intend to limit myself solely thereto, but to include all of the obvious variations and modifications within the spirit and scope of the appended claims.

I claim:

1. A gyroscope comprising in combination a hollow rotor, an internally threaded hollow stator mounted within said rotor, means for statically balancing said gyroscope including an externally threaded mass threadedly engaged within said stator for movement along the axis of the rotor upon rotation of the mass with respect to the stator, and means for releasably locking the mass to the stator.

2. A gyroscope comprising in combination a hollow cup-shaped rotor, an internally threaded hollow cup-shaped stator mounted within said rotor with its bottom disposed adjacent the open face of said rotor and having an aperture in its bottom, means for statically balancing said gyroscope including a mass threadedly engaged within said stator for movement axially of said rotor upon rotation of said mass with respect to said stator, said mass having at its face adjacent the bottom of the stator means engageable through said aperture for rotation of the mass with respect to the stator, and locking means for releasably securing said mass in fixed position with respect to the stator.

3. A gyroscope as defined in claim 2 wherein said locking means comprises a bolt engaging said mass through the bottom of the stator.

4. A gyroscope comprising in combination an assembly including a rotor and a stator mounted about a shaft, said assembly including spaced apart bearings interposed between said rotor and shaft, means for statically balancing said gyroscope including a mass adjustably secured to said stator for movement axially of said rotor, means for releasably locking said mass in fixed position with respect to said stator, and bearing adjustment means for simultaneously loading said spaced bearings from opposite sides, said adjustment means including threaded portions on said shaft at opposite sides of the bearings, the pitch of one threaded portion being different from the pitch of the other, thrust means for engaging said bearings at opposite sides including a member threaded on each said threaded portion, and means for rotating said shaft within said members to urge said members simultaneously toward and away from each other by reason of said difference in pitch.

5. A gyroscope comprising in combination a hollow cup-shaped rotor mounted on spaced bearings on a shaft, an internally threaded hollow cup-shaped stator mounted about said shaft within said rotor with the bottom of the stator disposed adjacent the open face of the rotor, means for statically balancing said gyroscope including a mass threadedly engaged within said stator about the shaft for movement axially of the shaft upon rotation of the mass with respect to the stator, locking means for releasably securing said mass in fixed position with respect to said stator, and bearing adjustment means for loading said spaced bearings simultaneously from opposite sides, said adjustment means including threaded portions on said shaft at opposite sides of said bearings, the pitch of one threaded portion being different from the pitch of the other, thrust means for engaging said bearings at opposite sides including a member threaded on each said threaded portion, and means for rotating said shaft within said members to urge said members toward and away from each other simultaneously by reason of said difference in pitch.

6. A gyroscope comprising in combination a gimbal frame, a shaft extending through opposite sides of said frame, a hollow cup-shaped rotor mounted on spaced apart bearings on said shaft, an internally threaded hollow cup-shaped stator mounted about said shaft within said rotor with the bottom of said stator disposed adjacent the open face of said rotor and secured to said gimbal frame, said bottom having an aperture therethrough, means for statically balancing said gyroscope including a mass threadedly engaged within said stator for movement axially of said shaft upon rotation of the mass with respect to said stator, means at the face of said mass adjacent the bottom of the stator engageable through said aperture for rotating said mass with respect to the stator, means for releasably locking said mass in fixed position with respect to said stator, and bearing adjustment means for loading said spaced bearings simultaneously from opposite sides including a threaded portion at each end of said shaft, the pitch of one threaded portion being different from the pitch of the other, a nut threaded on each end of the shaft bearing against the outer face of said frame sides, and means for rotating said shaft within said nuts to move said nuts and said frame sides toward and away from each other by reason of said difference in pitch to vary the load on said bearings.

References Cited in the file of this patent
UNITED STATES PATENTS

| | | |
|---|---|---|
| 1,136,666 | Gardner | Apr. 20, 1915 |
| 2,299,231 | Heintz et al. | Oct. 20, 1942 |
| 2,301,700 | Heintz | Nov. 10, 1942 |
| 2,353,139 | Beach | July 11, 1944 |
| 2,485,280 | Grace | Oct. 18, 1949 |
| 2,581,965 | Miller | Jan. 8, 1952 |
| 2,711,356 | Ensinger | June 21, 1955 |
| 2,714,311 | Dobson et al. | Aug. 2, 1955 |

FOREIGN PATENTS

| | | |
|---|---|---|
| 554,594 | Great Britain | July 12, 1943 |